AUTOMATIC TELEGRAPH MESSAGE NUMBERING APPARATUS

Filed Nov. 8, 1957 4 Sheets-Sheet 1

INVENTOR.
G. T. ROYDEN
BY
ATTORNEY

AUTOMATIC TELEGRAPH MESSAGE NUMBERING APPARATUS

Filed Nov. 8, 1957

INVENTOR
G. T. ROYDEN
BY
ATTORNEY

AUTOMATIC TELEGRAPH MESSAGE NUMBERING APPARATUS

Filed Nov. 8, 1957 4 Sheets-Sheet 3

INVENTOR
G. T. ROYDEN
BY
ATTORNEY

Sept. 27, 1960 G. T. ROYDEN 2,954,431
AUTOMATIC TELEGRAPH MESSAGE NUMBERING APPARATUS
Filed Nov. 8, 1957 4 Sheets-Sheet 4

INVENTOR
G. T. ROYDEN
BY
ATTORNEY 2,954,431

AUTOMATIC TELEGRAPH MESSAGE NUMBERING APPARATUS

George Taylor Royden, South Orange, N.J., assignor to Mackay Radio and Telegraph Company, New York, N.Y., a corporation of Delaware Filed Nov. 8, 1957, Ser. No. 695,413

7 Claims. (Cl. 178—17)

This invention relates in general to automatic telegraph numbering apparatus and in particular to sequencing and lock-out arrangements for a group of remotely located telegraph transmitters using the same telegraph line. Its principal object is to provide an economical and reliable system of the above character wherein messages from the group of transmitters are handled in a predetermined order of preference.

In some telegraph offices, it is customary to employ a group of individual message transmitters, a single number transmitter and a telegraph printer, all connected to one telegraph line. These systems permit efficient use of the number transmitters and printers. An example of such system is described in an article by Mr. A. F. Connery, entitled "Postal Telegraph Automatic System" published in Telephone and Telegraph Age, March 1952.

In such systems, message sheets or tapes are placed in each individual transmitter to initiate the transmission of a message. Control equipment associated with these transmitters control the number transmitter to automatically transmit, from a number tape, successive number and circuit designation letters identifying the message. A description of such number tape and the operation of a number transmitter is disclosed in U.S. Patent 2,850,095, issued September 2, 1958, to G. T. Royden.

In prior-art telegraph systems of the type above described, difficulty is encountered when two or more messages are to be transmitted simultaneously. Also, problems arise in according the more important transmitter with transmitting preference. Accordingly, an object of this invention is to provide allotting arrangements for controlling the operation of the transmitters on a one-at-a-time basis and for providing certain desired transmitters with transmitting preference.

Other objects and features of this invention will become apparent and the invention will be best understood by reference to the accompanying drawings comprising Figures 1, 2 and 5, wherein.

Figure 1:
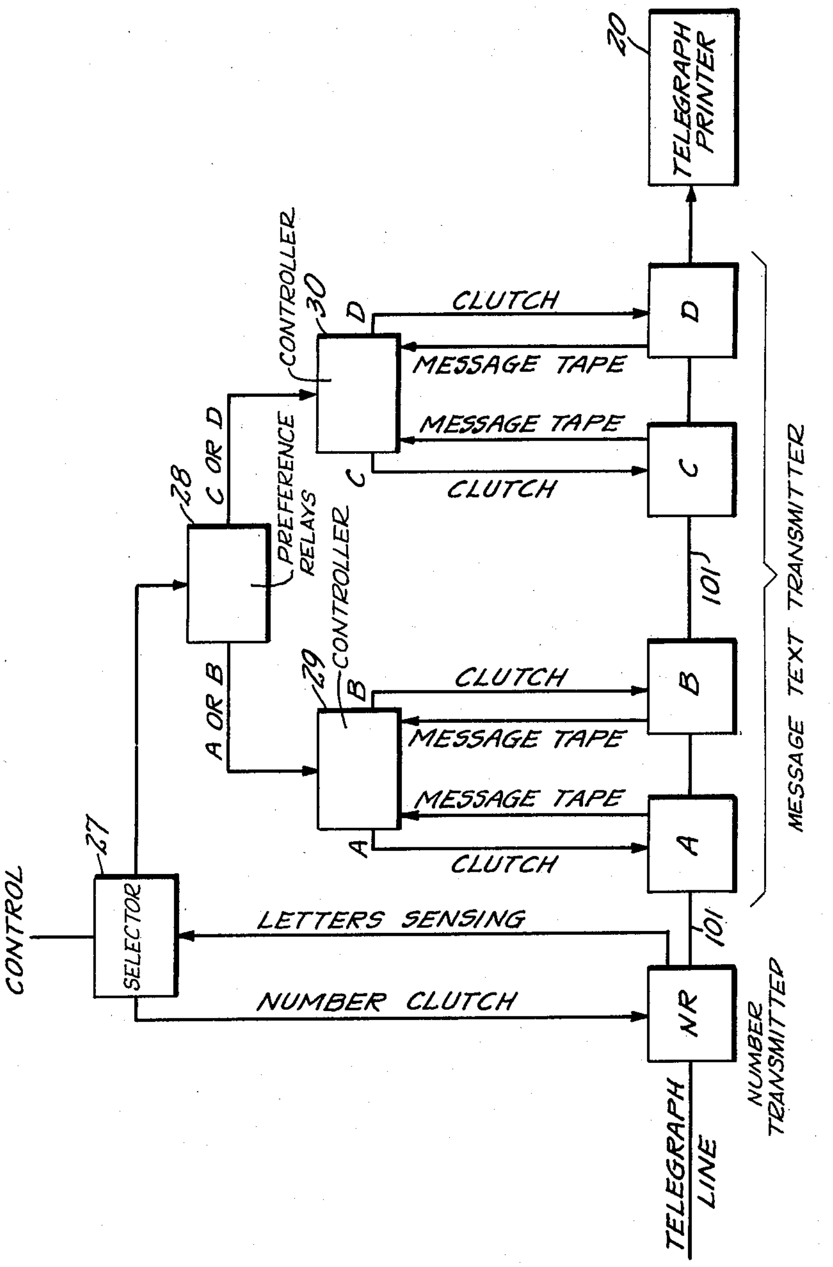
Fig. 1 is a single-line block diagram of a telegraph system in accordance with the invention.

Referring to Fig. 1, telegraph line 101 is shown connected to the number transmitter NR, a group of message transmitter distributors A to D, and a telegraph printer 20. (The message transmitters distributors are grouped in pairs, with pair A and B being controlled by controller 29 and pair C and D being controlled by controller 30. As will appear hereinafter, the controllers are interconnected to prevent overlapping operation of the associated transmitters. Preference relays 28 are associated with controllers 29 and 30 and function to select one or the other according to demand and fixed preferences. Transmitter selector 27 is associated with preference relays 28 and number transmitter 29, and functions to control the sequencing of the number transmitter and energized message transmitters.

Each message transmitter has a clutch circuit which is controlled by its associated controller. Preference circuits arrangements are provided for precluding the operation of the clutch circuit of more than one transmitter at a time. Thus, the message transmitters are rendered operative on a one-at-a-time basis.

The preference relays 28 and controllers 29 and 30 employ groups of time-controlled relays to provide any predetermined transmitter with operating preference on simultaneous demands. In addition to the above preference arrangements of the relay groups, lockout arrangements are provided for preventing interference from other relay groups.

Figure 2A:
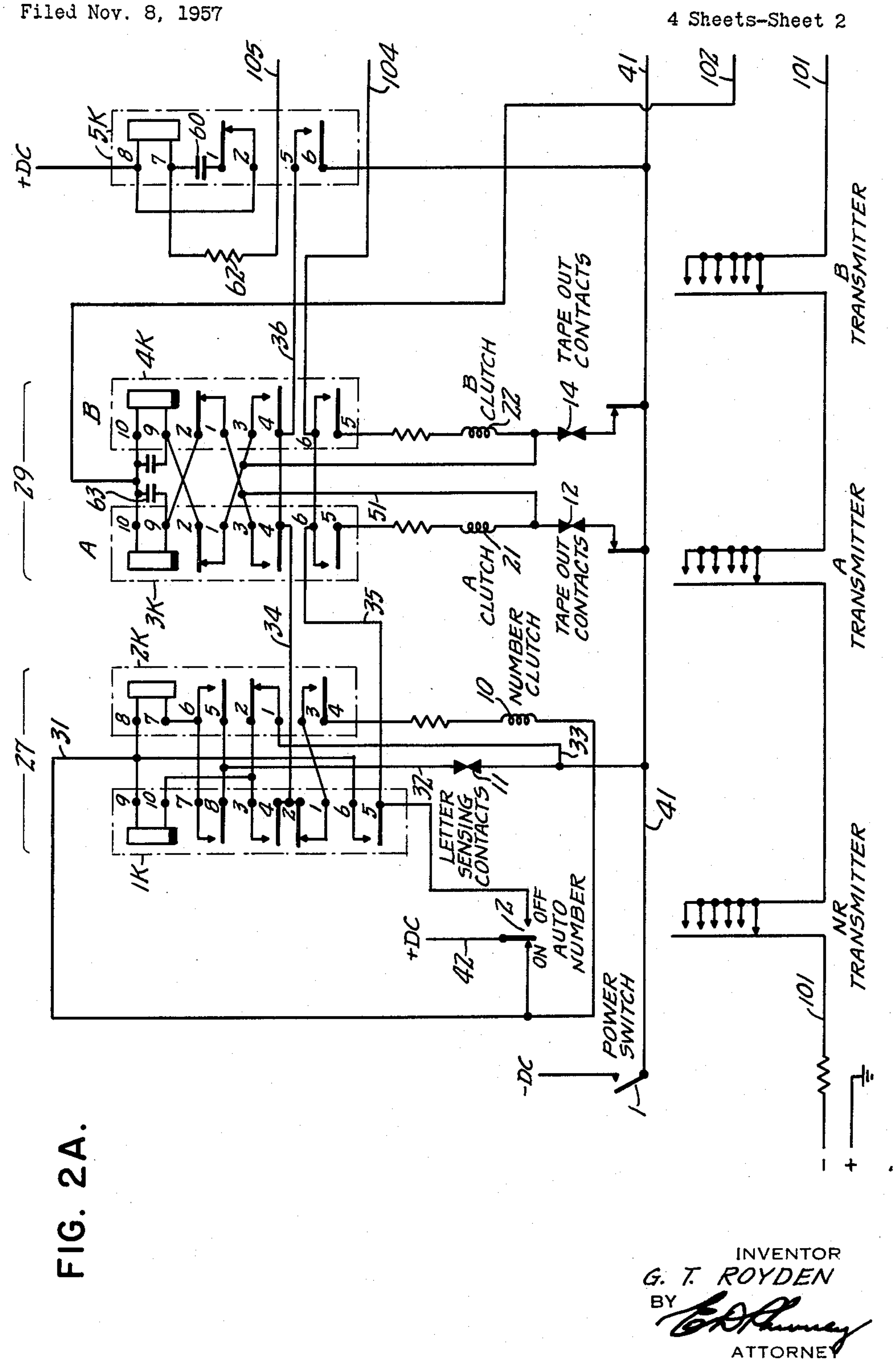
Figs. 2A and 2B is a detailed circuit diagram of the telegraph system of Fig. 1.
Figure 2B:
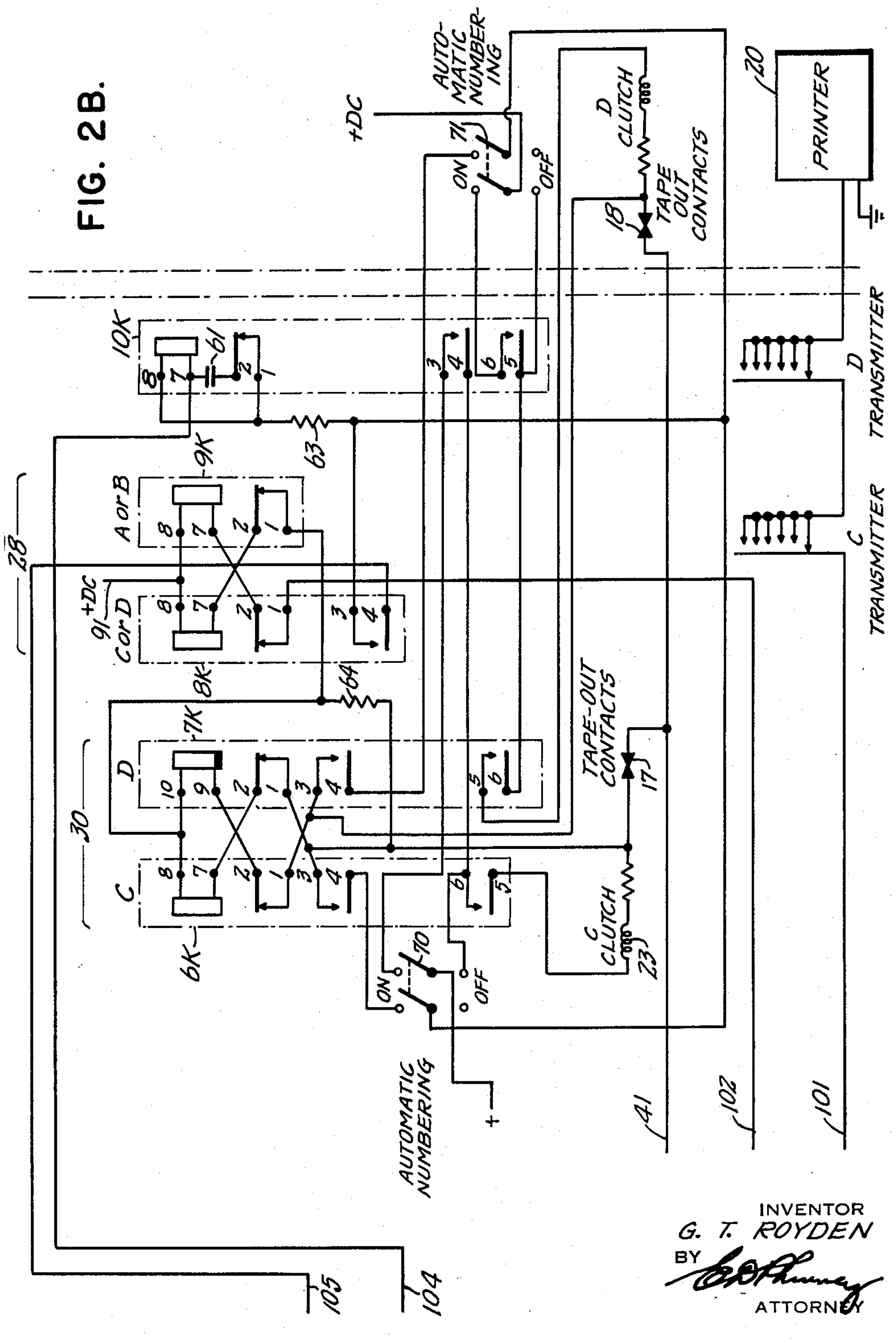

Referring now to the Figs. 2A and 2B of the drawing, a detailed description of the operation of the system will be given.

It is assumed that the present system is used by an airline company with transmitter C, being located at the flight dispatcher's office with the other message transmitters being located at the city office, branch office, and airport offices. The number transmitter can be located at any convenient place. It is also assumed that transmitter C has preference over all other transmitters.

When the power switch 1 is closed, the motors (not shown) start and the negative D.C. return 41 is closed. Current flows from +D.C. source 42 through the automatic number switch 2, lead 31, relay 1K through contacts 1 and 2 of relay 2K, lead 33 and switch 1, to operate relay 1K.

Closure of contacts 7, 8 of relay 1K causes relay 2K to operate over lead 32. Contacts 1, 2 of relay 2K open and release relay 1K. Relay 2K locks itself over lead 32 at its contacts 5, 6.

The apparatus is now ready to automatically transmit the circuit designation and serial number whenever a message tape is put into a transmitter distributor.

Placing a tape message in the A transmitter will cause relays 3K and 9K to operate over lead 51 and line 102, respectively, to +D.C. at 91 and −D.C. at switch 1.

Relays 4K, 6K, 7K and 8K are then locked out; relay 4K being locked out by relay 3K at contact 1, 2 while relays 6K, 7K and 8K are locked out by relay 9K at contact 1, 2.

The number clutch 10 is energized over lead 51, lead 34, through contact 3, 4 of relay 3K, contact 1, 2 of relay 1K and contact 3, 4 of relay 2K. Characters perforated in the previously prepared number tape are transmitted. When the letters perforations at the end of the group are sensed, the letters sensing contacts 11 are opened momentarily. This interrupts the holding current over lead 32 for relay 2K, which opens and breaks the circuit to the number clutch 10 at contacts 3, 4 of relay 2K.

The number transmitter NR stops when the circuit to clutch 10 is opened.

When relay 2K opens due to the momentary break at the letter sensing contacts 11, it also makes the circuit through relay 2K contacts 1, 2 leads 31 and 33 to relay 1K, which operates. However, the slug on relay 1K delays its operation long enough to complete transmission of the letters character before contacts 5, 6 of relay 1K close the circuit over leads 31 and 35 to the A message transmitter distributor through clutch 21. The circuit to relay 2K is re-established through contacts 7, 8 of relay 1K and it operates by virtue of the previous operation of relay 1K.

Relays 1K and 2K are both operated, thereby starting the A message transmitter.

Upon completing the transmission of the message from the A transmitter, the tape-out contacts 12 open and remain open. This breaks the circuit to the A clutch magnet 21 of the A transmitter, through closed contacts 5, 6 of relay 3K, lead 35 and closed contacts 5, 6 of relay 1K. The circuit to relay 1K is also opened at tape-out contacts 12 through contacts 3, 4 of relay 3K and contacts 3, 4 of relay 1K. The circuit to relay 3K and 9K is also opened at tape-out contacts 12 through lead 51, contacts 1, 2 of relay 4K, lead 102 and contacts 1, 2 of relay 8K. Relay 2K remains operated through its contacts 5, 6 and lead 32. The apparatus is now ready to automatically transmit the circuit designation and serial number for another message, when its tape is put in a transmitter distributor.

A second message tape may be placed in another transmitter distributor while the message from the A transmitter is being transmitted at the A location.

Assume a torn tape message to have been placed in the B transmitter distributor and made ready to start. This closes tape-out contacts 14. Relay 4K had been locked out by relay 3K operated, until relay 3K releases at the open tape-out contacts 12.

A large capacitor 63 in shunt with relay 3K delays its release long enough to permit relay 1K to release first, thereby preparing the automatic numbering control circuitry so it will start before the message in the B transmitter.

When relays 4K and 9K operate, contacts 3, 4 of relay 4K close the circuit to the number clutch 10 over lead 34, contacts 1, 2 of relay 1K and contacts 3, 4 of relay 2K. The circuit designation serial number and message are transmitted as before.

Now, assume message tapes to have been placed in all other transmitter distributors A, C, D, while a message is running in the B transmitter. As previously explained, it is desired to give preference to the message in the C transmitter, even though it may have been placed in its transmitter after the tapes were placed in the A and D transmitters.

Figure 3:
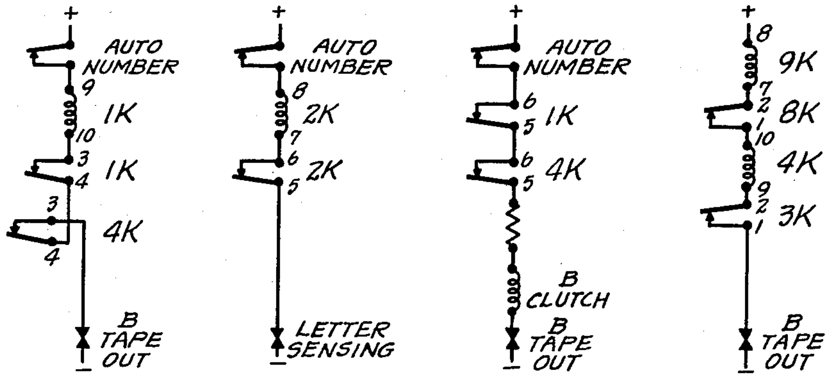
Figs. 3, 4 and 5 are explanatory diagrams for use in tracing circuits in Figs. 2A and 2B.

Before the message in the B transmitter ends, the control circuits are as shown in Fig. 3. Relays 1K, 2K, 4K and 9K are operated. Relays 3K, 5K, 6K, 7K and 8K are not operated.

When the tape runs out of the transmitter, the B tape-out contacts open and release relays 1K, 4K and 9K, as well as the B clutch 22. Relay 2K remains operated. Relay 9K releases quickly. After a delay, relays 1K and 4K release.

Figure 4:
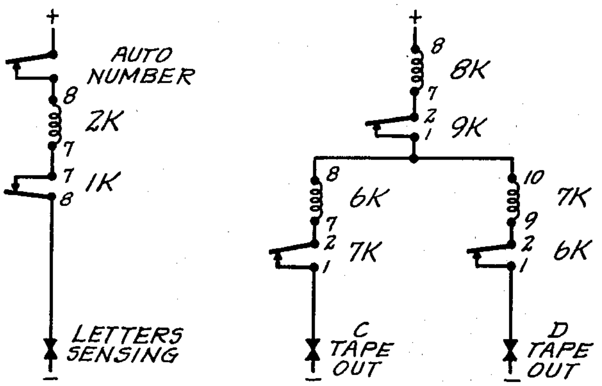

After relay 9K releases, the closed circuits are as indicated in Fig. 4. Relay 2K remains operated until relay 1K releases after a delay. Quick-acting relay 6K closes before slow-operating relay 7K because the slug on relay 7K delays its closure. When relay 6K operates, it locks out relay 7K through contacts 1, 2 of relay 6K.

Figure 5:
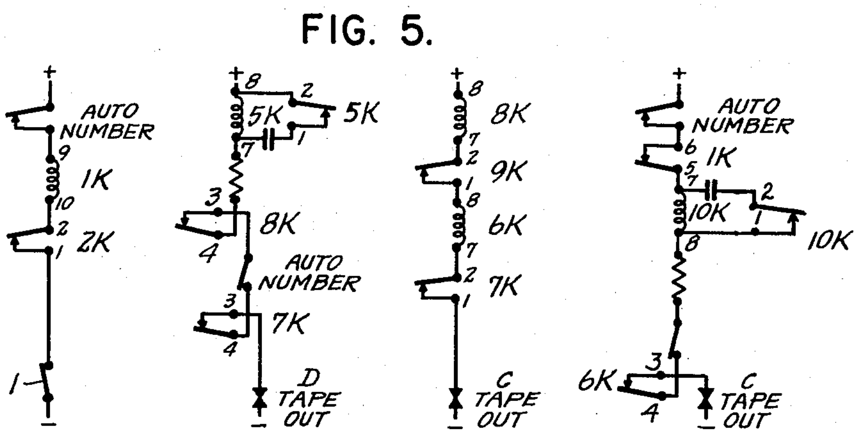

After relays 1K and 2K release, and relays 6K and 8K operate, the closed circuits are as shown in Fig. 5. Relays 5K and 10K will be slow to operate because of the time required to charge the capacitors 60, 61 respectively in shunt with the relay windings through the series resistors 62 and 63. This delays closing contacts 5, 6 of relay 5K through leads 36 and 34 to the number clutch 10. This also delays closing contacts 3, 4 of relay 10K to the clutch circuit 23 of C transmitter until the automatic numbering relays recycle; that is relay 1K operates, relay 2K operates, and relay 1K releases. Then, after relay 5K operates, the clutch 10 for the number transmitter NR is energized. Meanwhile, relay 10K has been further delayed because of contacts 5, 6 of relay 1K having opened. Upon sensing a letters character in the number tape, the letters sensing contacts 11 open momentarily, causing the relay 2K to release and stop the number transmitter NR. After a slight delay, relay 1K operates. Closure of contacts 5, 6 on relay 1K energizes the circuit to relay 10K through leads 35 and 104 and contacts 3, 4 of relay 6K. After a delay, contacts 3, 4 on relay 10K close and clutch 23 of transmitter C is energized.

This is the manner in which the transmitter at location C obtains precedence.

At the end of the message, tape-out contacts 17 open and break the circuit to the C clutch magnet 23, as well as to relays 6K, 8K and 10K. When contacts 3, 4 of relay 8K open, the circuit through lead 105 and resistor 62 is broken to relay 5K. The capacitor 60 is disconnected from the coil of relay 5K, at contacts 1, 2 thereof, so it will release quickly, thereby permitting relay 1K to release without undue delay. The circuit to relay 1K through leads 34 and 36 is broken at contacts 5, 6 of relay 5K. The release of relay 1K prepares the number transmitter NR again for transmission of the circuit identification and serial number for the next message.

After the serial number is sent, the message in one of the other transmitter distributors A or D is sent, followed by that in the remaining transmitter.

If a message is being sent by the C transmitter distributor, and a tape is inserted in the D transmitter distributor, it is necessary for relay 10K to release quickly to avoid starting the message in the D transmitter without a serial number. Contacts 1, 2 of relay 10K in series with the shunt capacitor 61 make this feasible.

If message tapes are put in the C and A transmitters (or B transmitter or both) while a tape is running in the D transmitter, relay 8K is held locked up by current through the resistor 64 in order to ensure preference to the C transmitter in starting.

If it is desired to send a message from location A (or B) without a serial number, such as a request for verification or correction, the automatic numbering control may be disabled by placing switch 2 in the "Off" position. Similarly, switch 70 may be switched off to disable the automatic number circuit at the C position or switch 71 at the D location.

It should be understood by those skilled in the art that three message transmitters may be employed rather than four, or by an extension of the principles disclosed, more than four message transmitters may be used. With regard to the means shown for obtaining delays by slugs on relays and capacitors in shunt with the relay windings, it is obvious to one skilled in the art that other means are applicable, such as an R-C network to control the rise of voltage applied to the starter electrode of a cold cathode tube in series with the relay winding.

While I have described above the principles of my invention in connection with specific apparatus, and particular modifications thereof, it is to be clearly understood that this description is made only by way of example and not as a limitation on the scope of my invention.

What is claimed is:

1. Telegraph apparatus comprising four automatic message tape transmitter distributors, an automatic serial number tape transmitter distributor connected thereto, and a preference control circuit for one message tape transmitter distributor including three pairs of relays, each relay of a pair being cross-connected to lock out the other relay of the pair, the control relay for the preferred message transmitter distributor being a quick-acting and the relays for the other message transmitter distributors having a slow-operating characteristic.

2. In a telegraph system, a telegraph line, a first transmitter and a group of second transmitters on said line for transmitting message information thereover, means in the first transmitter for transmitting route-destination informaion and means in each second transmitter for transmitting text information, means in each second transmitter for generating a demand indication whenever any message is to be transmitted therefrom controller means common to said second transmitters including means operable in response to demand indications from said second transmitters for selecting them for operation on a one-at-a-time basis to transmit their respective messages, selecting means associated with the first transmitter and the said controller means for alternately energizing the first transmitter and a selected second transmitter to transmit their respective messages in a predetermined order, means responsive to the initiation of transmission by any second transmitter for causing the controller to select such transmitter and to control the selecting means to energize the first transmitter to transmit route-destination information, and means responsive to the completion of transmission of route-destination information for energizing the selected second transmitter to transmit the text information.

3. In a telegraph system, a telegraph line, a first transmitter and a group of second transmitters on said line for transmitting message information thereover, means in the first transmitter for transmitting route-destination information and means in each second transmitter for transmitting text information, means in each second transmitter for generating a demand indication whenever any message is to be transmitted therefrom, controller means common to said second transmitters including means operable in response to demand indications from said second transmitters for selecting them for operation on a one-at-a-time basis to transmit their respective messages, selecting means associated with the first transmitter and the said controller means for alternately energizing the first transmitter and a selected second transmitter to transmit their respective messages in a predetermined order, means for providing an order of preference between the second transmitter, means responsive to the simultaneous initiation of transmission by more than one second transmitter for causing the controller to select the second transmitter having preference and to control the selecting means to energize the first transmitter to transmit route-destination information pertaining to the message of the selected second transmitter, means responsive to the completion of transmission of the said route-destination information for energizing the selected second transmitter to transmit the text information.

4. In a telegraph system according to claim 3, the said means for providing an order of preference including time-controlled relays.

5. In a telegraph system, a telegraph line, a number transmitter and a first and second pair of text transmitters on said line for transmitting message information thereover, means in the number transmitter for transmitting routing information and means in each text transmitter for transmitting message text information, separate controllers for each pair of text transmitters, means in each controller for selecting their associated transmitters for operation on a one-at-a-time basis to transmit their respective messages, preference relays for controlling the controller on a one-at-a-time basis, selecting means associated with the number transmitter and the said preference relays for alternatively energizing the number transmitter and one of said text transmitters to transmit their respective messages in a predetermined order, means responsive to the initiation of transmission by text transmitter for causing the controllers to select such transmitter according to control by the preference relays and to control the selecting means to energize the number transmitter to transmit routing information, and means responsive to the completion of transmission of the routing information for energizing the selected text transmitter to transmit the text information.

6 In a telegraph system, a telegraph line, a number transmitter and a first and second pair of text transmitters on said line for transmitting message information thereover, means in the number transmitter for transmitting routing information and means in each text transmitter for transmitting message text information, separate controllers for each pair of text transmitters, means in each controller for selecting their associated transmitters for operation on a one-at-a-time basis to transmit their respective messages, preference relays for controlling the controllers on a one-at-a-time basis, selecting means associated with the number transmitter and the said preference relays for alternatively energizing the number transmitter and one of said text transmitters to transmit their respective messages in a predetermined order, means for providing an order of preference between the text transmitters, of any pair, means for providing an order of preference between the controllers, means in the controllers responsive to the simultaneous initiation of transmission by more than one text transmitter in each pair for selecting the associated transmitter having preference, means in the selecting relays responsive to the said initiation of transmission for selecting the controller having preference, and means responsive to the selection of a controller for energizing the number transmitter to transmit the routing information pertaining to the text transmitter selected by the selected controller.

7. In a telegraph system according to claim 6, the said means in the preference relays and in the controllers for providing an order of preference including time-controlled relays.

References Cited in the file of this patent

UNITED STATES PATENTS

| | | |
|---|---|---|
| 2,501,063 | Levin | Mar. 21, 1950 |
| 2,609,451 | Hansen | Sept. 2, 1952 |
| 2,612,562 | Baker | Sept. 30, 1952 |
| 2,667,533 | Zenner | Jan. 26, 1954 |
| 2,677,011 | Burwell | Apr. 27, 1954 |